United States Patent
Shin et al.

(10) Patent No.: US 9,810,935 B2
(45) Date of Patent: Nov. 7, 2017

(54) DISPLAY DEVICE

(71) Applicant: Samsung Display Co., Ltd., Yongin-si, Gyeonggi-Do (KR)

(72) Inventors: Jai Ku Shin, Yeoju-si (KR); Hee Gon Kim, Seoul (KR); Seong Sik Ahn, Seoul (KR); Kyoung Ah Lee, Seoul (KR); Tae Kyoung Hwang, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 14/821,593

(22) Filed: Aug. 7, 2015

(65) Prior Publication Data

US 2016/0085110 A1 Mar. 24, 2016

(30) Foreign Application Priority Data

Sep. 22, 2014 (KR) .................. 10-2014-0125760

(51) Int. Cl.
*G02F 1/1333* (2006.01)
(52) U.S. Cl.
CPC ............... *G02F 1/133308* (2013.01); *G02F 2001/133317* (2013.01)
(58) Field of Classification Search
CPC .............. G02F 1/133308; G02F 2001/133317
See application file for complete search history.

(56) References Cited

U.S. PATENT DOCUMENTS

| | | | |
|---|---|---|---|
| 7,782,419 B2 | 8/2010 | Hahm et al. | |
| 7,791,279 B2 | 9/2010 | Kwon et al. | |
| 2007/0139605 A1* | 6/2007 | Matsuda | G02F 1/133308 349/158 |
| 2013/0227829 A1* | 9/2013 | Hsu | G02F 1/133308 29/428 |
| 2013/0314638 A1 | 11/2013 | Ahn et al. | |
| 2013/0321740 A1 | 12/2013 | An et al. | |
| 2014/0009914 A1 | 1/2014 | Cho et al. | |
| 2015/0017393 A1 | 1/2015 | Oh et al. | |
| 2015/0036077 A1 | 2/2015 | Lee et al. | |
| 2015/0042920 A1* | 2/2015 | Lee | G02F 1/1336 349/60 |
| 2015/0062480 A1 | 3/2015 | Cho et al. | |
| 2016/0224059 A1* | 8/2016 | Song | G06F 1/1601 |

FOREIGN PATENT DOCUMENTS

| | | |
|---|---|---|
| JP | 2013-242493 A | 12/2013 |
| KR | 10-2009-0053366 A | 5/2009 |
| KR | 10-2009-0070132 A | 7/2009 |
| KR | 10-2013-0117110 A | 10/2013 |
| KR | 10-1319543 B1 | 10/2013 |
| KR | 10-2013-0132232 A | 12/2013 |
| KR | 10-2014-0007202 A | 1/2014 |
| KR | 10-2014-0017161 A | 2/2014 |

* cited by examiner

*Primary Examiner* — Nathanael R Briggs
(74) *Attorney, Agent, or Firm* — H.C. Park & Associates, PLC

(57) ABSTRACT

A display device includes: a display panel curved in one direction; and a middle frame supporting a lower edge portion of the display panel. The middle frame includes: a first support having a predetermined curvature; and a second support extending at a predetermined angle from the first support, the first support having a height difference at an end portion.

19 Claims, 7 Drawing Sheets

DISPLAY DEVICE

CLAIM OF PRIORITY

This application makes reference to, incorporates the same herein, and claims all benefits accruing under 35 U.S.C. §119 from an application earlier filed in the Korean Intellectual Property Office on 22 Sep. 2014 and there duly assigned Serial No. 10-2014-0125760.

BACKGROUND OF THE INVENTION

Field of the Invention

Aspects of embodiments of the present invention relate to a display device including a frame configured to support and fix a display panel to have a constant curvature.

Description of the Related Art

Display devices are categorized into a liquid crystal display (LCD) device, an organic light emitting diode (OLED) display device, a plasma display panel (PDP), an electrophoretic display (EPD) device, and the like according to a light emitting method.

In recent years, as a screen size of the display device has increased, a viewing angle difference has become disadvantageously increased between cases where a viewer looks at a center portion; and left and right end portions of a screen. That is, when an image displayed on a screen is viewed from a position corresponding to the center portion of a large display device, a viewer may clearly recognize an image at the center portion of the screen; however, the viewer may not clearly recognize images at left or right sides.

In order to compensate for this viewing angle difference, a curved display device has been developed where right and left end portions are concavely curved with respect to the center portion of a screen. The curved display devices may be categorized into two types: a portrait type having a longer vertical length than a horizontal length and curved in a vertical direction; and a landscape type having a longer horizontal length than a vertical length and curved in a horizontal direction.

Display panels having a flat form may be coupled to a fixing frame having a curved form to manufacture a curved display device. In this case, due to a spring-back phenomenon that refers to the tendency of a display panel to return to its initial flat form, shear stress may occur in the display panel. In particular, larger shear stress may occur at an end portion compared to a center portion, thereby causing light leakage at the end portions of the display panel.

It is to be understood that this background of the technology section is intended to provide useful background for understanding the technology and as such disclosed herein, the technology background section may include ideas, concepts or recognitions that were not part of what was known or appreciated by those skilled in the pertinent art prior to a corresponding effective filing date of subject matter disclosed herein.

SUMMARY OF THE INVENTION

The present disclosure of invention is directed to reducing shear stress occurring at end portions of a display panel of a curved display, thereby improving light leakage phenomenon.

According to an embodiment of the present invention, a display device includes: a display panel curved in one direction; and a middle frame supporting a lower edge portion of the display panel. The middle frame includes: a first support having a predetermined curvature; and a second support extending at a predetermined angle from the first support, wherein the first support has a height difference at an end portion.

The first support may include a first center portion and a first end portion extending from the first center portion and having a smaller thickness than the first center portion.

The first end portion may have substantially the same thickness as the second support.

The display panel may be spaced apart from at least a part of the first end portion and at least a part of the second support.

The display panel may be 0.1 mm or more and 1 mm or less spaced apart from the first end portion and the second support.

The first end portion may have a length that accounts for 3% or more and 30% or less of a whole length of the first support.

The second support may include a second center portion and a second end portion extending from the second center portion and having a smaller thickness than the second center portion.

The first end portion may have substantially the same thickness as the second end portion.

The display panel may be spaced apart from at least a part of the first end portion and at least a part of the second end portion.

The display panel may be 0.1 mm or more and 1 mm or less spaced apart from the first and second end portions.

The second end portion may have a length that accounts for 1% or more and 40% or less of a whole length of the second support.

The display panel may have a smaller curvature than the first support.

The display panel may have a smaller curvature at the end portion than the center portion.

The display panel may have a smaller curvature from the center portion to the end portion.

According to embodiments of the present invention, a fixing frame of a curved display device that supports and fixes a display panel may be changed into a different form to reduce shear stress occurring at end portions of the display panel, thereby improving light leakage phenomenon occurring at end portions of the display panel.

The foregoing is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
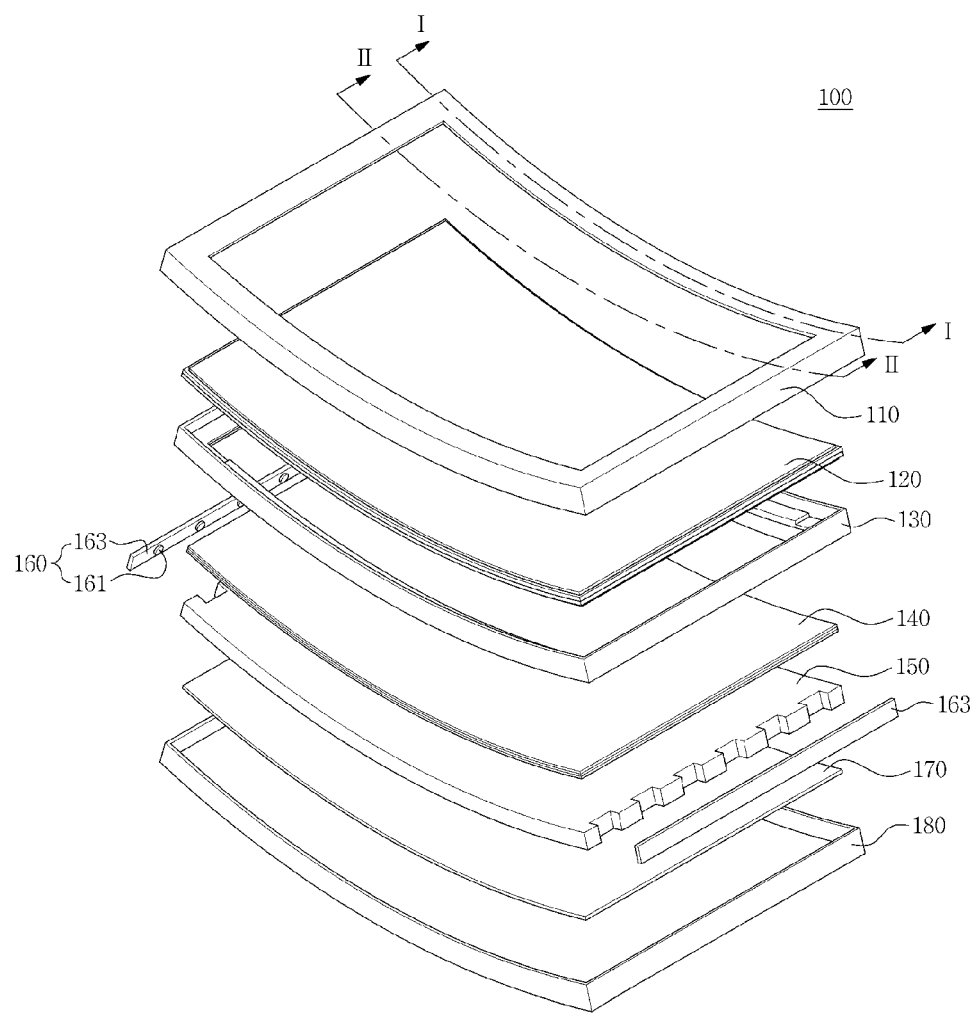
FIG. 1 is an exploded perspective view illustrating a display device according to an embodiment of the present invention.

Hereinafter, embodiments of the present disclosure of invention will be described in more detail with reference to the accompanying drawings.

Although the present invention can be modified in various manners and have several embodiments, specific embodiments are illustrated in the accompanying drawings and will be mainly described in the specification. However, the scope of the embodiments of the present invention is not limited to the specific embodiments and should be construed as including all the changes, equivalents, and substitutions included in the spirit and scope of the present invention.

Throughout the specification, when an element is referred to as being "connected" to another element, the element is "directly connected" to the other element, or "electrically connected" to the other element with one or more intervening elements interposed therebetween. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

It will be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" can be termed likewise without departing from the teachings herein.

Some of the parts which are not associated with the description may not be provided in order to specifically describe embodiments of the present invention, and like reference numerals refer to like elements throughout the specification.

Hereinafter, a display device is described as a landscape type where the display panel has a longer width than a length and curved in a horizontal direction, but is not limited thereto.

The display device is described as a LCD panel, but is not limited thereto. In some embodiments, the display panel may be an OLED panel.

Further, the display device is described as including an edge-type backlight unit, but is not limited thereto. In some embodiments, the backlight unit may be a direct type or a corner type.

Figure 2:
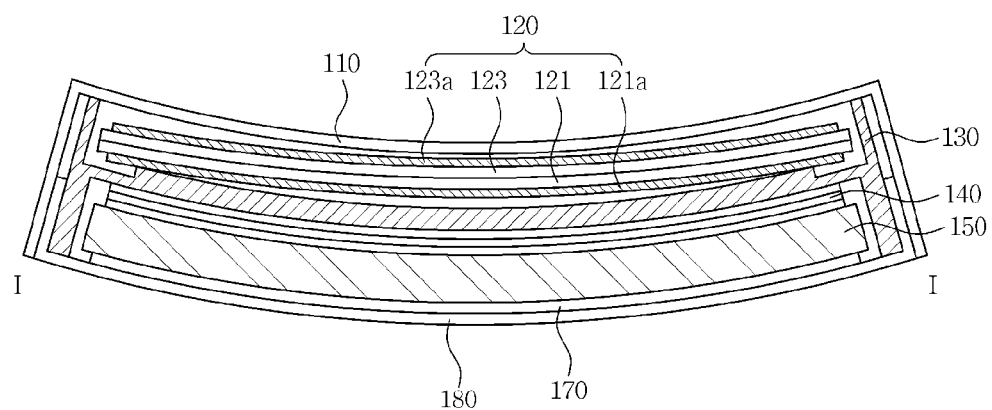
FIG. 2 is a cross-sectional view taken along line I-I of FIG. 1.
Figure 3:
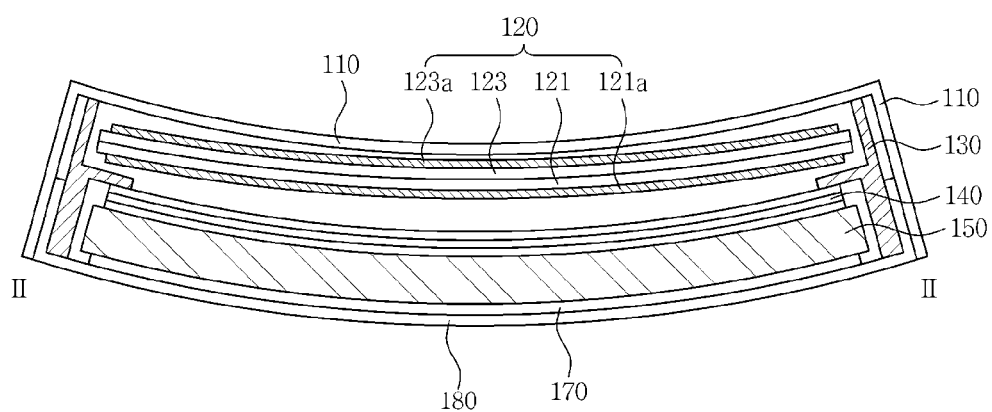
FIG. 3 is a cross-sectional view taken along line II-II of FIG. 1.

FIG. 1 is an exploded perspective view illustrating a display device according to an embodiment of the present invention, FIG. 2 is a cross-sectional view taken along line I-I of FIG. 1, and FIG. 3 is a cross-sectional view taken along line II-II of FIG. 2.

A display device 100 according to an embodiment of the present invention may be a landscape-type display device including an edge-type backlight unit.

In reference to FIGS. 1 through 3, the display device 100 according to an embodiment of the present invention may include an upper frame (or a top chassis) 110, a display panel 120, a middle frame (or a mold frame) 130, an optical sheet 140, a light guide plate 150, a light source unit 160, a reflective sheet 170, and a lower frame (or a bottom chassis) 180. Hereinafter, a backlight unit is defined as a concept including the middle frame 130, the optical sheet 140, the light guide plate 150, the light source unit 160, the reflective sheet 170, and the lower frame 180. The above-listed elements may have a concavely curved form in accordance with a curved surface.

A fixing frame including the upper frame 110, the middle frame 130, and the lower frame 180 may be manufactured to have a predetermined curvature. The display panel 120 may have a curved form before coupled to the fixing frame or after being coupled to the fixing frame.

That is, a flexible-type display panel 120 may have a curved form after being coupled to the fixing frame and a rigid-type display panel 120 may have a predetermined curvature before being inserted into the fixing frame. The display panel 120 may be generally manufactured into a flat form and have a predetermined curvature, when coupled to the fixing frame. The fixing frame may have a radius of curvature of about 1000 mm to 5000 mm.

The upper frame 110 may have an opening for exposing an active area of the display panel 120 outwards and may be disposed to cover an edge portion of an upper surface and side surfaces of the display panel 120.

The upper frame 110 may be configured to fix the edge portion of the upper surface of the display panel 120 and prevent the display panel 120 from being separated from the backlight unit. The upper frame 110 may be fixed to the middle frame 130 and the lower frame 180. The upper frame 110 may be fixed to the middle frame 130 and the lower frame 180 by hooks and/or screws.

The upper frame 110 may be formed of a rigid metal material such as stainless steel or a heat-dissipating material such as aluminum or an aluminum alloy. The upper frame 110 may be formed by a mold press process and the like to have a predetermined curvature.

The display panel 120 is configured to display an image using light and may have a quadrangular panel form. The display panel 120 may be a flexible panel bendable in at least one direction. In the display panel 120, two relatively longer sides (hereinafter long sides) may have a concavely curved form having a predetermined curvature and two relatively shorter sides (hereinafter short sides) may have a straight form. In some embodiments, the short sides may have a concavely curved form having a predetermined curvature and long sides may have a straight form.

The display panel 120 may include a first substrate 121, a second substrate 123 disposed to face the first substrate 121, and a liquid crystal layer (not illustrated) disposed between the first and second substrates 121 and 123.

The first substrate 121 may include a plurality of pixel electrodes arranged in a matrix form, a thin film transistor configured to apply a driving voltage to the respective pixel electrodes, and various signal lines configured to drive the pixel electrodes and the thin film transistor.

The second substrate 123 may be disposed to face the first substrate 121 and include a common electrode formed of a transparent conductive material and a color filter. The color filter may have types of red, green, and blue color filters.

The liquid crystal layer (not illustrated) may be interposed between the first and second substrates 121 and 123 and may include liquid crystal molecules that reorient themselves in accordance with an electric field formed between the pixel electrode and the common electrode. Accordingly, the reoriented liquid crystal layer may adjust transmittance of light emitted from the backlight unit and the adjusted light may pass through the color filter, such that an image can be displayed.

In addition, a lower polarizer 121a may be further disposed on a bottom surface of the first substrate 121 and an upper polarizer 123a on an upper surface of the second substrate 123. The lower and upper polarizers 121a and 123a may have surface areas corresponding to the display panel 120. The upper polarizer 123a may only pass light having a predetermined polarization direction among light incident from the outside and absorb or block other light. The lower polarizer 121a may only pass light having a predetermined polarization direction among light emitted from the backlight unit and absorb or block other light.

A driving circuit substrate (not illustrated) may be disposed on at least one side of the display panel 120 to drive the display panel 120. The driving circuit substrate may apply various control and power signals to drive the display panel 120.

The middle frame 130 may have a quadrilateral-loop shape. The middle frame 130 may support the display panel 120 and accommodate the optical sheet 140, the light guide plate 150, and the like. The middle frame 130 may be integrally formed as a single unit but may include a plurality of units, where necessary.

The middle frame 130 may be formed of a flexible material such as plastic so as to prevent damage on the display panel 120. The middle frame 130 may be formed by an injection molding process and the like so as to have a predetermined curvature. A detailed configuration of the middle frame 130 will be described below.

The optical sheet 140 may be disposed on the light guide plate 150 and may diffuse and/or collect light directed from the light guide plate 150. The optical sheet 140 may include a diffusion sheet, a prism sheet, and/or a protective sheet. The diffusion sheet, the prism sheet, and the protective sheet may be sequentially laminated on the light guide plate 150 in the order listed.

The prism sheet may collect light guided by the diffusion sheet 150, the diffusion sheet may diffuse light collected by the prism sheet, and the protective sheet may protect the prism sheet. Light leaving the protective sheet may be directed toward the display panel 120.

The light guide plate 150 may uniformly direct light provided from the light source unit 160 to the display panel 120. The light guide plate 150 may be flatly manufactured and may be coupled to the fixing frame so as to have a predetermined curvature. The light guide plate 150 may be formed of a material that is bendable to have a predetermined curvature.

The light guide plate 150 may include a quadrilateral plate, but is not limited thereto. When light emitting diode (LED) chip is used as a light source, the light guide plate 150 may have various shapes including predetermined grooves, protrusions, or the like depending on the position of the light source.

The light guide plate 150 may be referred to as a plate for ease of description but may be in a shape of a sheet or a film, forming a slim display device. In other words, the light guide plate 150 may include the plate and the film for guiding light.

The light guide plate 150 may include a light-transmissive material such as, for example, acrylic resins, such as polymethylmethacrylate (PMMA), or polycarbonate (PC) so as to guide light efficiently.

The reflective sheet 170 may be disposed between the light guide plate 150 and the lower frame 180. The reflective sheet 170 may reflect light emitted downwards from the light guide plate 150 towards the display panel 120, and therefore may increase light efficiency.

The light source unit 160 may include a light source 161 and a circuit substrate 163 on which the light source 161 may be disposed.

The light source 161 may be disposed at a corner portion or on a light incident surface of the light guide plate 150. In other words, the light source 161 may emit light toward the corner portion or the light incident surface of the light guide plate 150. The light source 161 may include at least one LED chip (not illustrated) and a package (not illustrated) for accommodating the LED chip. For example, the LED chip (not illustrated) may be a gallium nitride (GaN)-based LED chip that emits blue light.

The number of the light source 161 may vary in consideration of size and luminance uniformity of the display panel 120. The circuit substrate 163 may include a printed circuit board (PCB) or a metal PCB.

Although not illustrated, a wavelength converting unit (not illustrated) may be disposed between the light guide plate 150 and the light source unit 160. The wavelength converting unit (not illustrated) may include a substance that can change a wavelength of light. For example, the wavelength converting unit may change a wavelength of blue light emitted from a blue LED light source, so that the blue light may be converted to white light.

Further, a heat dissipating member (not illustrated) may be disposed between the light source unit 160 and the lower frame 180. The heat dissipating member may release heat generated by the light source unit 160 to the outside. When the light source unit 160 is disposed on one side surface of the lower frame 180 in a bar or line shape, a metal frame having a bar or line shape may be disposed as the heat dissipating member. Accordingly, the heat dissipating member may have various shapes depending on the shape of the light source unit 160.

The reflective sheet 170 may include, for example, polyethylene terephthalate (PET), and may reflect light. A surface of the reflective sheet 170 may be coated with a diffusion layer including, for example, titanium dioxide. The reflective sheet 170 may include a material containing metal, such as silver (Ag).

The lower frame 180 may be configured to maintain a framework of the display device and protect a variety of components accommodated therein. The lower frame 180 may include a rigid metal material such as stainless steel or a heat dissipating material such as aluminum or aluminum alloys. The lower frame 180 may be formed by a mold press process and the like so as to have a predetermined curvature.

Figure 4:
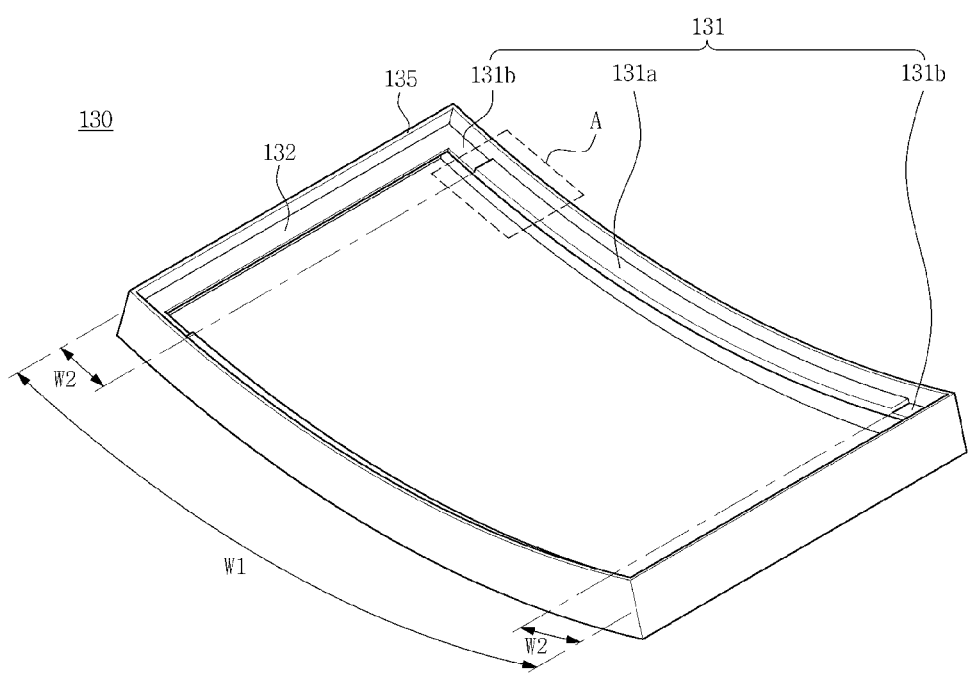
FIG. 4 is a perspective view illustrating a middle frame according to an embodiment of the present invention.
Figure 5:
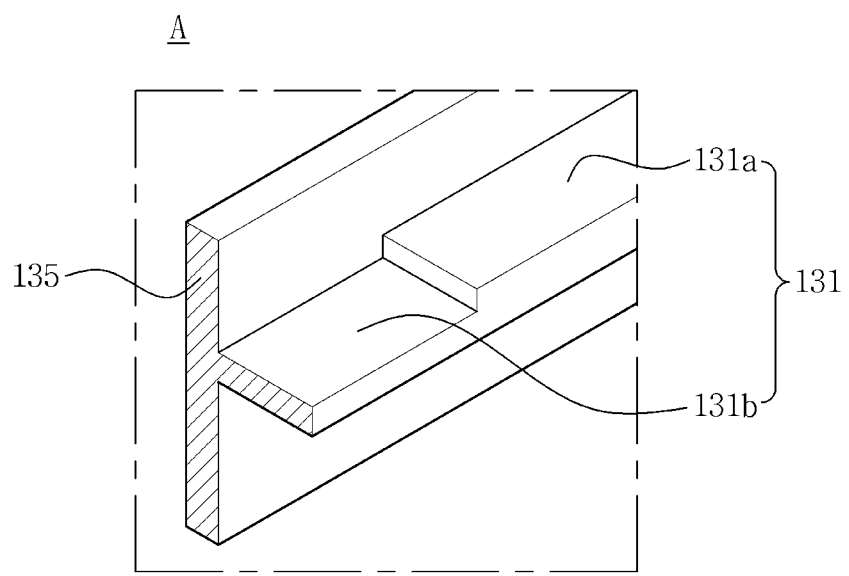
FIG. 5 is an enlarged perspective view illustrating "A" part of FIG. 4.

FIG. 4 is a perspective view illustrating a middle frame according to an embodiment of the present invention. FIG. 5 is an enlarged perspective view illustrating "A" part of FIG. 4.

In reference to FIGS. 4 and 5, the middle frame 130 according to an embodiment of the present invention may include a support supporting a lower edge portion of the display panel and a fixing unit 135 fixed to the lower frame and supporting an upper frame. The support may include a first support 131 having a predetermined curvature and a second support 132 extending at a predetermined angle from the first support 131 and having a straight form. The fixing unit 135 may adjust a distance between the display panel 120 and the upper frame 110.

The display device according to an embodiment of the present invention may be a landscape type where long sides of the display panel may be supported by the first support 131 and short sides of the display panel may be supported by the second support 132.

The display device according to another embodiment of the present invention may be a portrait type where short sides of the display panel may be supported by the first support 131 and long sides of the display panel may be supported by the second support 132.

The first support 131 may be manufactured to have a radius of curvature of about 1000 mm to 5000 mm. The second support 132 may extend at a predetermined angle from the first support 131 and have a straight form.

The first support 131 may be partitioned into a first center portion 131a and first end portions 131b disposed at both end portions of the first center portion 131a. A length W2 of the first end portion 131b may account for 3% or more and 30% or less of the whole length W1 of the first support 131.

The first end portion 131b may have a less height in a thickness direction of the display panel compared to the first center portion 131a. The first end portion 131b and the first center portion 131a may have a height difference of about 0.1 mm or more and 1 mm or less.

The second support 132 may have a less height compared to the first center portion 131a. The second support 132 and the first center portion 131a may have a height difference of about 0.1 mm or more and 1 mm or less.

The second support 132 may have a less or substantially the same height as compared to the first end portion 131b.

The first end portion 131b may have a smaller thickness compared to the first center portion 131a and the second support 132 may have a smaller thickness compared to the first center portion 131a. The second support 132 may have a smaller or substantially the same thickness compared to the first end portion 131b.

The display panel disposed on the first end portion 131b may be totally spaced apart from the first end portion 131b or spaced apart from the most part of the first end portion 131b. Likewise, the display panel disposed on the second support 132 may be totally spaced apart from the second support 132 or spaced apart from the most part of the second support 132. The display panel may be spaced apart from the first end portion 131b and the second support 132 having a distance of about 0.1 mm or more and 1 mm or less.

Accordingly, with a structure where a part of the middle frame 130 supporting both end portions of the display panel is omitted (short sides of a landscape type and long sides of a portrait type), the curvature of the both end portions of the display panel may be decreased, thereby reducing shear stress concentrated on both end portions of the display panel. As a result, light leakage occurring at both end portions of the display panel may be improved and mura may be prevented.

Figure 6:
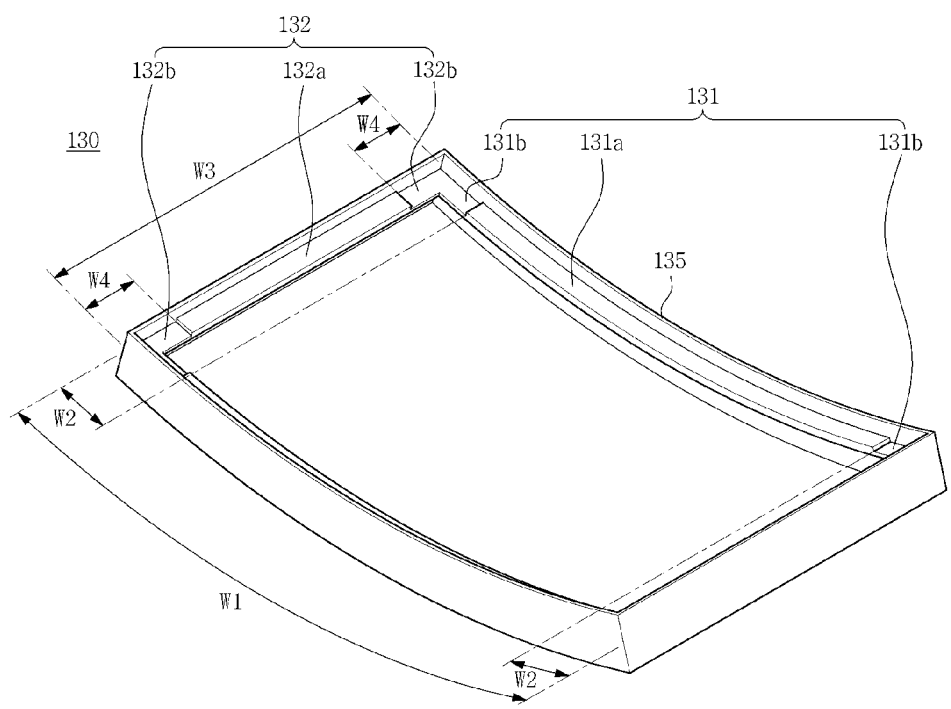
FIG. 6 is a perspective view illustrating a middle frame according to another embodiment of the present invention.

FIG. 6 is a perspective view illustrating a middle frame according to another embodiment of the present invention.

The repeated description of the middle frame according an embodiment of the present invention will be omitted.

In reference to FIG. 6, the middle frame 130 according to another embodiment of the present invention may include a support configured to support a lower edge portion of a display panel. The middle frame 130 may also include a fixing unit 135 fixed to the lower frame and supporting an upper frame. The support may also include a first support 131 having a predetermined curvature and a second support 132 extending at a predetermined angle from the first support 131 and having a straight form.

The first support 131 may have a radius of curvature of about 1000 mm to 5000 mm. The second support 132 may extend at a predetermined angle from the first support 131 and have a straight form.

The first support 131 may be partitioned into a first center portion 131a and a first end portion 131b disposed at both end portions of the first center portion 131a, and the second support 132 may also be partitioned to include a second center portion 132a and a second end portion 132b disposed at both end portions of the second center portion 132a.

A length W2 of the first end portion 131b may account for 3% or more and 30% or less of the whole length (W1) of the first support 131. A length W4 of the second end portion 132b may account for 1% or more and 40% or less of the whole length (W3) of the second support 132.

The first end portion 131b may have a smaller height taken in a thickness direction of the display panel as compared to the first center portion 131a, and the second support 132 may have a smaller height taken in a thickness direction of the display panel as compared to the first center portion 131a. The second support 132 may have a taken in a thickness direction of the display panel as or substantially the same height as compared to the first end portion 131b.

The second end portion 132b may have a taken in a thickness direction of the display panel as height as compared to the second center portion 132a, and the second end portion 132a may have a smaller or substantially the same height as compared to the first end portion 131b.

The first end portion 131b may have a smaller thickness compared to the first center portion 131a, and the second support 132 may have a smaller thickness as compared to the first center portion 131a. The second support 132 may have a smaller or substantially the same thickness as compared to the first end portion 131b.

The second end portion 132b may have a smaller thickness as compared to the second center portion 132a, and may have a smaller or substantially the same thickness as compared to the first end portion 131b.

The display panel disposed on the first end portion 131b may be totally spaced apart from the first end portion 131b or spaced apart a majority of the first end portion 131b. Likewise, the display panel disposed on the second end portion 132b may be totally spaced apart from the second end portion 132b or spaced apart a majority of the second end portion 132b.

The display panel may be spaced apart from the first and second end portions 131b and 132b by a distance of about 0.1 mm or more and 1 mm or less.

The curved display device 100 includes an upper frame 110 curved in a direction, a lower frame 180 curved in the direction, a middle frame 130 curved in the direction and disposed between the upper and the lower frames. The middle frame 130 has a side wall extending towards the upper and the lower frames, and an upper terminal of the side wall is in contact with the upper frame 110 and a lower terminal of the side wall is in contact with the lower frame 180. The middle frame 130 has a ring which has an outer peripheral facing and in contact with an inner side of the side wall of the lower frame 180, and an inner peripheral forming an opening exposing the middle portion of the display panel 120, and the ring includes an upper surface facing the upper frame and a lower surface facing the lower frame. The upper surface of the ring of the middle frame has at least one protrusion protruding towards the upper frame and in contact with the display panel.

Figure 7:
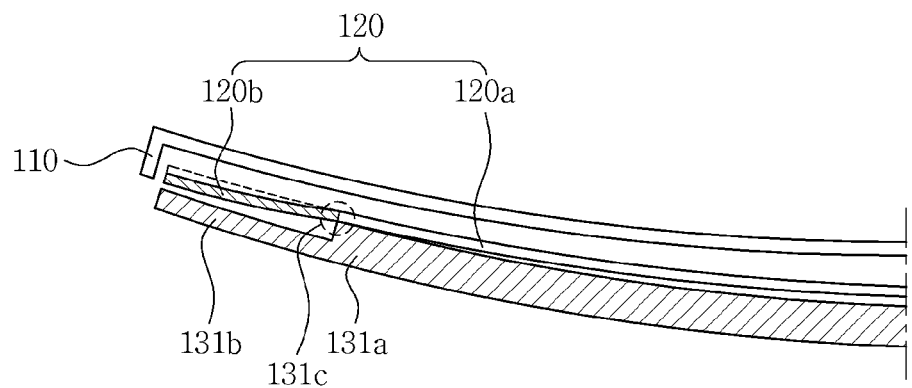
FIGS. 7 to 9 are diagrams illustrating a display-panel supporting configuration according to an embodiment of the present invention.
Figure 8:
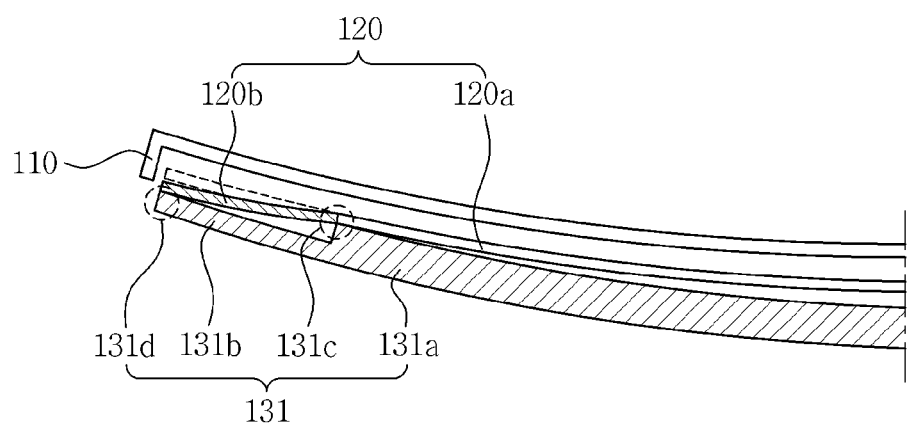
Figure 9:
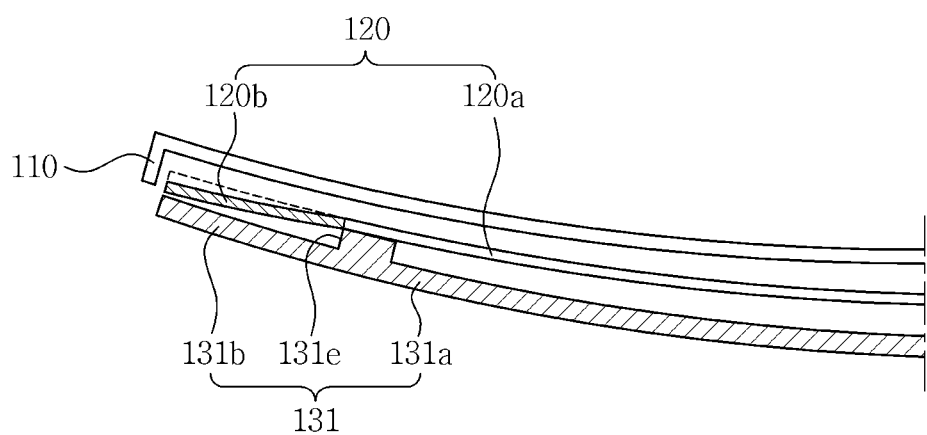

FIGS. 7 through 9 are diagrams illustrating a display-panel supporting configuration according to embodiments of the present invention.

In FIGS. 7 through 9, elements except for the upper frame 110, the display panel 120, and the first support 131 of the middle frame may be omitted for ease of description. Further, portions of the display panel 120 disposed on the first center portion 131a is called a center portion 120a and portions of the display panel 120 disposed on the first end portion 132a is called an end portion 120b for sake of brevity.

In reference to FIG. 7, the display panel 120 according to an embodiment of the present invention may be supported by an end 131c of the first center portion 131a. In this case, support reaction weight applied on the end 131c of the first center portion 131a is F1.

With respect to the end 131c of the first center portion 131a, the curvature of the display panel 120 may vary. The display panel 120 may have a smaller curvature in the first end portion 131b than the first center portion 131a. That is, the end portion 120b of the display panel 120 may have a smaller curvature than the center portion 120a. Further, the display panel 120 may have a smaller curvature going from the center portion 120a to the end portion 120b.

Accordingly, as the curvature of the end portion 120b of the display panel 120 is decreased, shear stress concentrated on the end portion 120b of the display panel may be reduced. As a result, light leakage phenomenon occurring at both end portions of the display panel may be improved and mura may be prevented.

In reference to FIG. 8, the display panel according to another embodiment of the present invention may be supported by an end 131c of the first center portion 131a and an end 131d of the first end portion 131b. In this case, support reaction weight applied on the end 131c of the first center portion 131a is F2 and support reaction weight applied on the end 131d of the first end portion 131b is F3.

When comparing the supporting structures illustrated in FIGS. 7 and 8, the whole support reaction weight F1 may be applied on the end 131c of the first center portion 131a in FIG. 7, whereas the support reaction weight F2 and F3 may be divided and respectively applied to the end 131c of the first center portion 131a and the end 131d of the first end portion 131b. Each support reaction weight may have a relationship of F1>F2>F3.

In reference to FIG. 9, the display panel 120 according to another embodiment of the present invention may be supported by a projection 131e formed on the first support 131. In this case, with respect to the projection 131e, the first center portion 131a may be divided from the first end portion 131b.

From the foregoing, it will be appreciated that various embodiments in accordance with the present disclosure have been described herein for purposes of illustration, and that various modifications may be made without departing from the scope and spirit of the present teachings. Accordingly, the various embodiments disclosed herein are not intended to be limiting of the true scope and spirit of the present teachings.

What is claimed is:

1. A display device, comprising:
    a display panel curved in one direction and having a front side from which an image is viewed and a back side opposite from the front side; and
    a middle frame supporting an edge portion of the back side of the display panel, wherein the middle frame comprises:
        a first support having a first side facing the back side of the display panel and having a predetermined curvature; and
        a second support having a first side facing the back side of the display panel and extending at a predetermined angle from the first support from corners of the middle frame, wherein the first support has a first center portion and first end portions, the first center portion being spaced apart from the corners by the first end portions, the first end portions being recessed with respect to the first center portion to allow portions of the display panel that correspond to the first end portions to have less curvature than portions of the display panel that correspond to the first center portion.

2. The display device of claim 1, wherein the first end portions have a smaller thickness than the first center portion.

3. The display device of claim 2, wherein the first end portions are recessed from the first center portion in a direction corresponding to a direction normal to corresponding portions of the back side of the display panel.

4. The display device of claim 2, wherein the display panel is spaced apart from at least a part of the first end portions and at least a part of the second support.

5. The display device of claim 4, wherein the display panel is spaced apart from each first end portion and the second support by a distance in the range of 0.1 to 1.0 mm.

6. The display device of claim 2, wherein each of the first end portions has a length that accounts for 3% to 30% of a whole length of the first support.

7. A display device comprising:
    a display panel curved in one direction; and
    a middle frame supporting a lower edge portion of the display panel,
    wherein the middle frame comprises:
    a first support having a predetermined curvature; and
    a second support extending at a predetermined angle from the first support, wherein the first support has a height difference at an end portion, wherein the first support comprises a first center portion and a first end portion extending from the first center portion and having a smaller thickness than the first center portion, wherein the second support comprises a second center portion and a second end portion extending from the second center portion and having a smaller thickness than the second center portion.

8. The display device of claim 2, wherein the second support comprises a second center portion and second end portions extending from the second center portion, the second end portions having a surface facing the back side of the display panel that is recessed as compared to the second center portion and has a smaller thickness than the second center portion, wherein the first end portions have substantially the same thickness as the second end portions.

9. The display device of claim 8, wherein the display panel is spaced apart from at least a part of each of the first end portions and at least a part of each of the second end portions.

10. The display device of claim 9, wherein the display panel is spaced apart from the first and second end portions by a distance in the range of 0.1 to 1.0 mm.

11. The display device of claim 8, wherein each of the second end portions have a length that accounts for 1% to 40% of a whole length of the second support.

12. The display device of claim 1, wherein the display panel has a smaller curvature than the first support, the display device further comprises a light guide plate arranged on a second and opposite side of the first and second supports to provide light to the display panel, the first and second supports being interposed between the edge portions of the display panel and edge portions of the light guide plate.

13. The display device of claim 12, wherein the display panel has a smaller curvature at locations corresponding to the end portions than at locations corresponding to the center portion.

14. The display device of claim 12, wherein the display panel has a smaller curvature in going from the center portion to any of the end portions.

15. A curved display device, comprising:
an upper frame curved in a direction;
a lower frame curved in the direction and disposed opposite to the upper frame;
an intermediate frame curved in the direction and disposed between the upper and lower frames; and
a display panel curved in the direction, the display panel disposed between the upper and intermediate frame,
wherein the intermediate frame comprises a side wall extending towards the upper and lower frames, and an upper terminal of the side wall is in contact with the upper frame and a lower terminal of the side wall is in contact with the lower frame,
wherein the intermediate frame comprises a ring which has an outer peripheral facing and in contact with an inner side of the side wall and an inner peripheral forming an opening exposing a portion of the display panel, and the ring comprises an upper surface facing the upper frame and a lower surface facing the lower frame, and
wherein the upper surface of the ring of the intermediate frame comprises at least one protrusion protruding towards the upper frame and in contact with the display panel, wherein portions of the upper surface of the ring corresponding to corners of the display panel are recessed in a direction normal to a corresponding portion of the display panel from the protrusion to allow for the display panel to have a greater radius of curvature at portions of the display panel corresponding to the corners than at other portions of the display panel.

16. The curved display device of claim 15, further comprising a light guide plate, wherein edges of the light guide plate correspond to the lower surface of the ring of the intermediate frame, wherein the ring is interposed between the light guide plate and the display panel.

17. The curved display device of claim 15, wherein portions of the ring corresponding to the at least one protrusion having a greater thickness than portions of the ring corresponding to the recesses, wherein the thickness is taken in a direction normal to a corresponding portion of the display panel and the backlight.

18. The curved display device of claim 15, wherein the sidewall together with the ring have a T-shaped cross section with the sidewall being the top of the "T" and the ring being a vertical portion of the "T".

19. The curved display device of claim 15, wherein the protrusion of the upper surface of the ring being spaced apart from portions of the ring that correspond to corners of the display by the portions of the ring where the upper surface is recessed as compared to the protrusion.

* * * * *